March 11, 1969          J. P. DANKESE          3,432,357
FLUENT MATERIAL DISTRIBUTION SYSTEM AND FUEL CELL THEREWITH
Filed Sept. 28, 1964
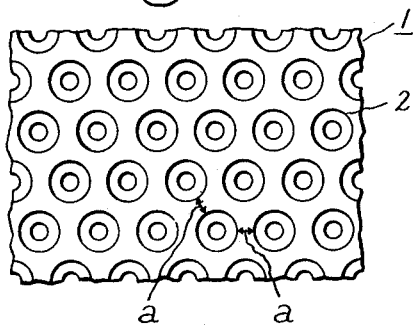
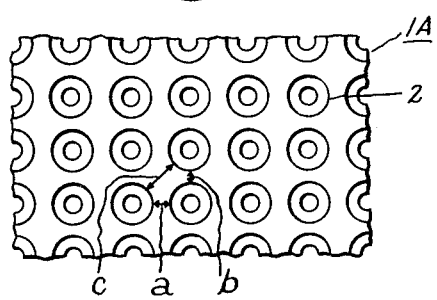
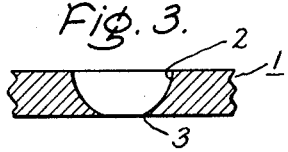
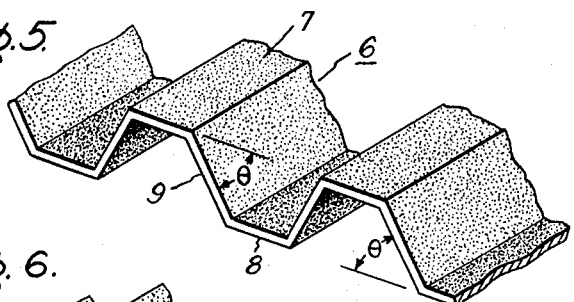
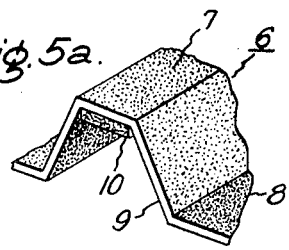
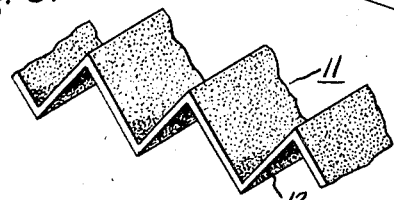
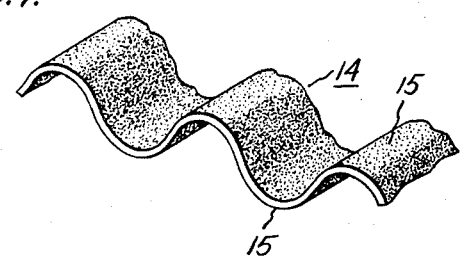
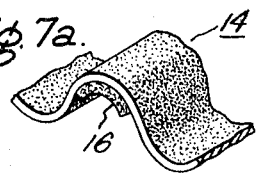
Inventor:
Joseph P. Dankese,
by Paul A. Frank
His Attorney.

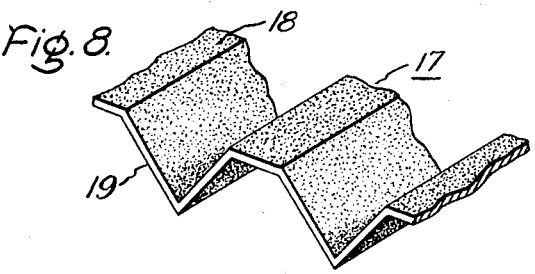
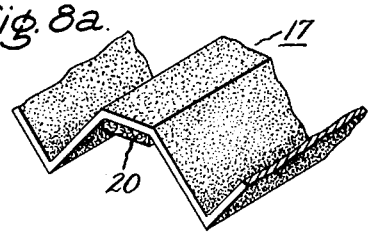
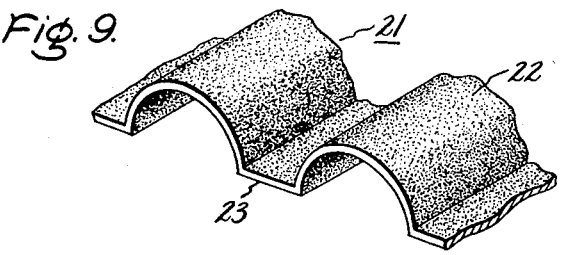
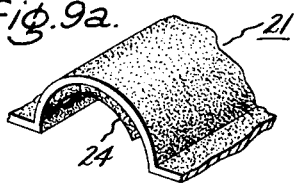
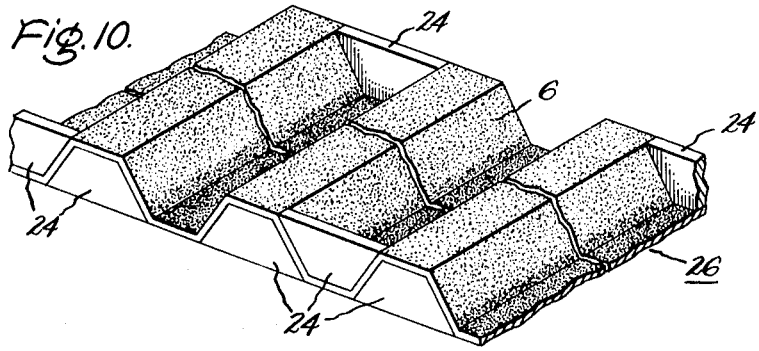
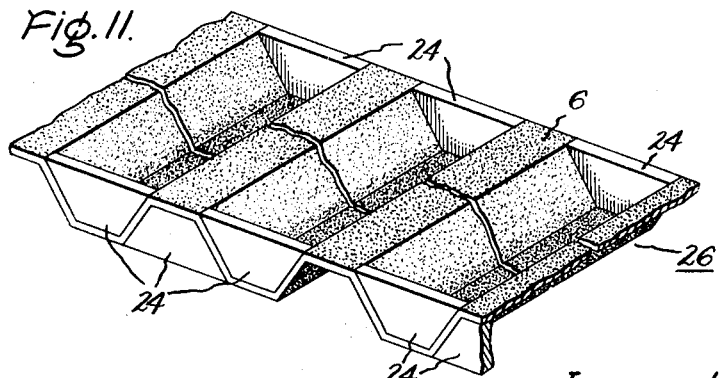

Inventor:
Joseph P. Dankese,
by Paul A. Frank
His Attorney.

Inventor:
Joseph P. Dankese,
by Paul A. Frank
His Attorney.

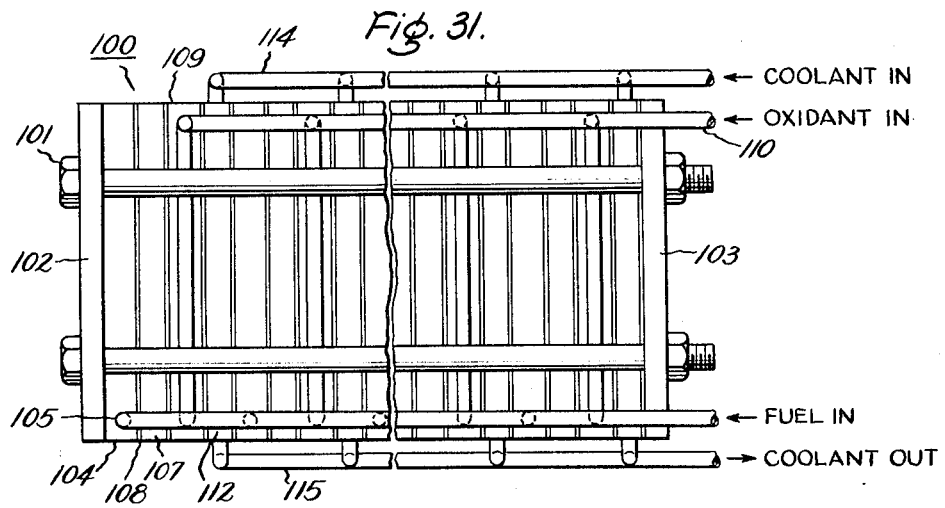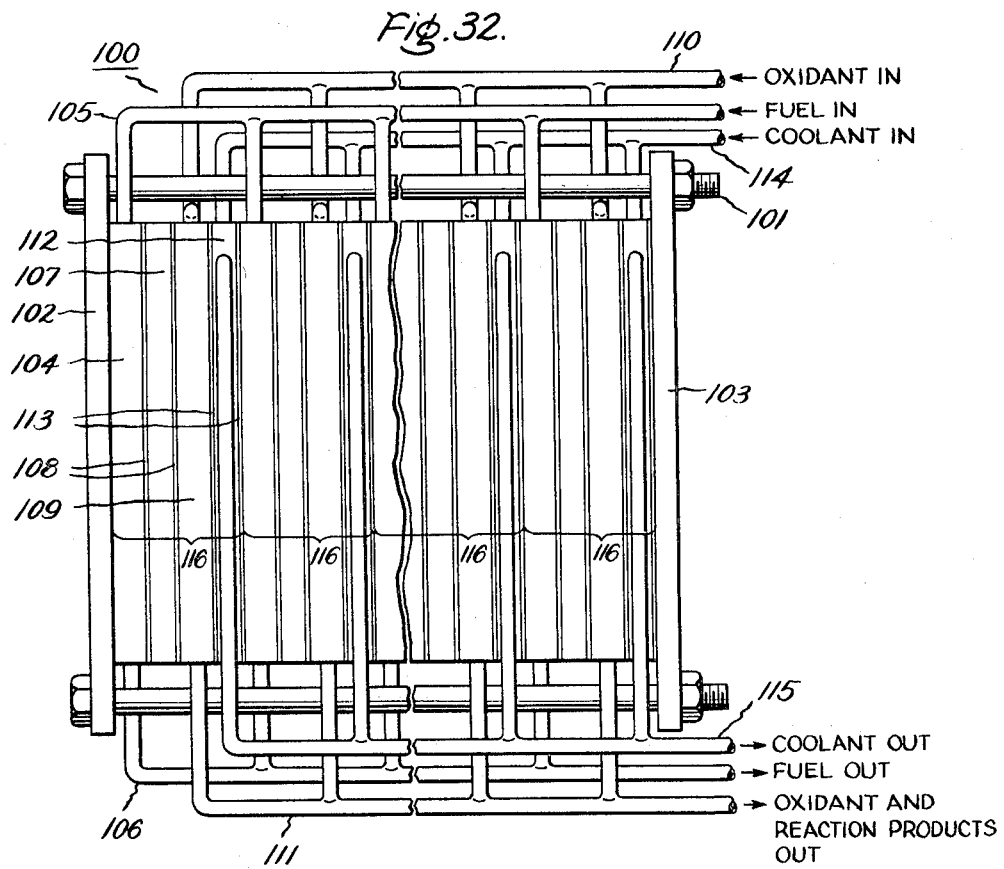

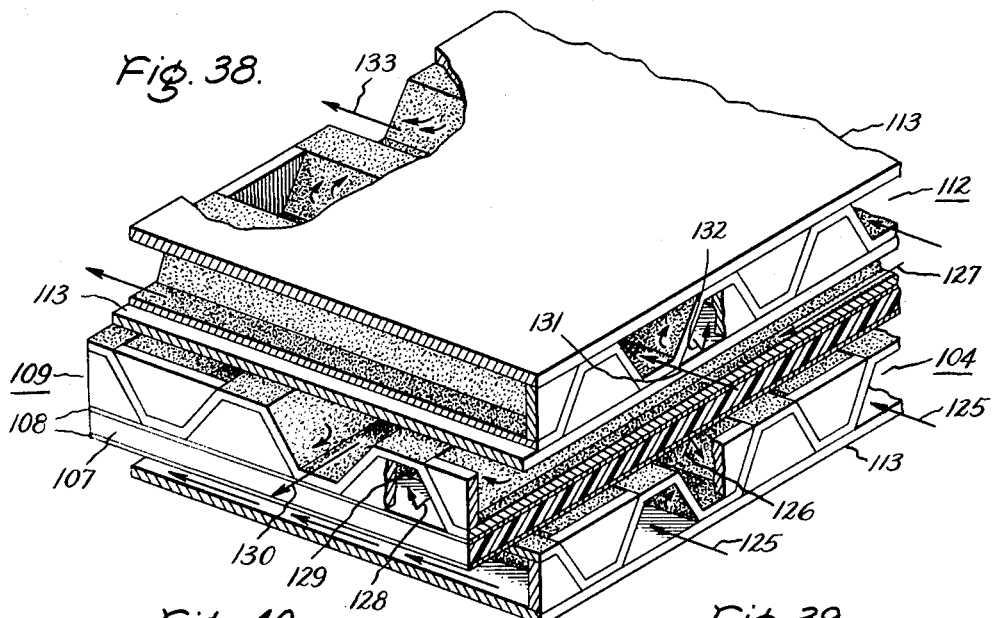
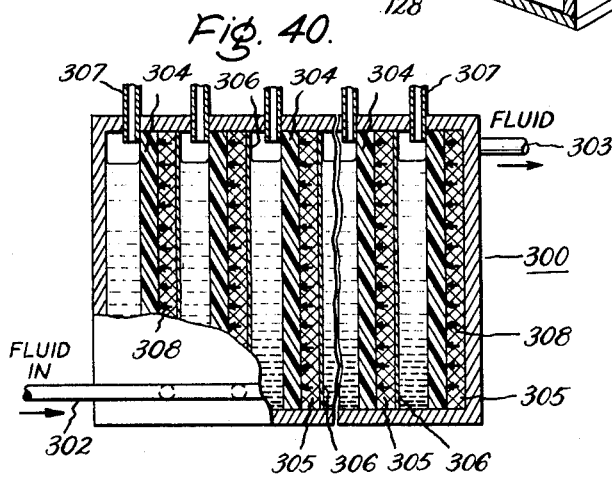
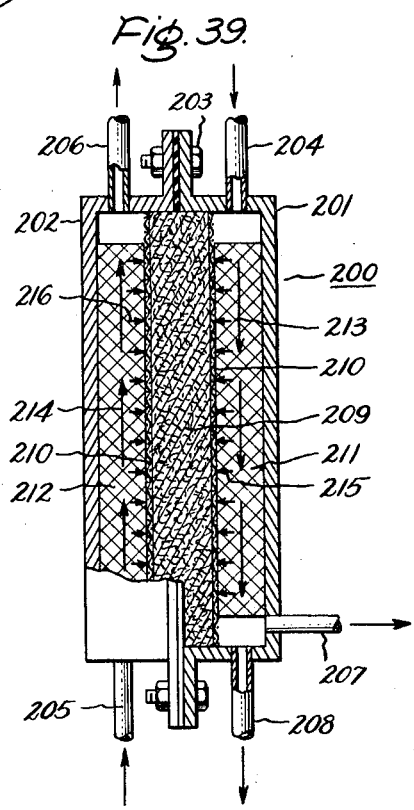
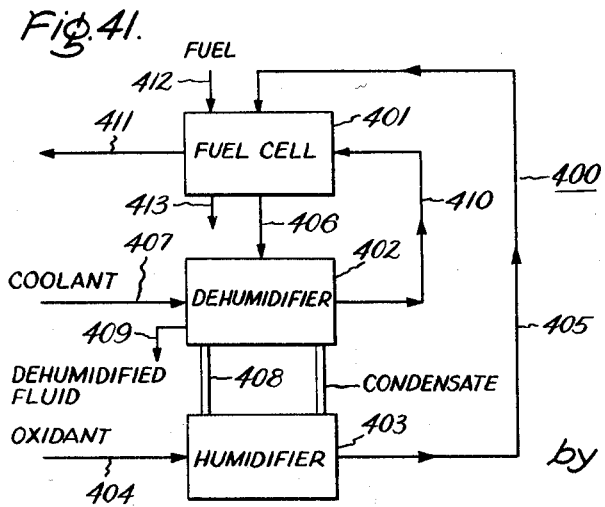

United States Patent Office 3,432,357
Patented Mar. 11, 1969

3,432,357
FLUENT MATERIAL DISTRIBUTION SYSTEM AND FUEL CELL THEREWITH
Joseph P. Dankese, Dorchester, Mass., assignor to General Electric Company, a corporation of New York
Filed Sept. 28, 1964, Ser. No. 399,494
U.S. Cl. 136—86                35 Claims
Int. Cl. H01m 27/14

ABSTRACT OF THE DISCLOSURE

To allow the uniform distribution of a fluent material to a transfer surface a perforate corrugated sheet is placed in contact with the surface. The sheet may have a high perforation density and may have tapered, nozzle shaped perforations. In a specific cell application, the corrugated sheet may be placed in contact with a catalytic body with plugs and imperforate elements being associated to direct a fluid reactant into impingement with the catalytic body.

---

This invention relates to a new and improved fluid distribution system capable of effecting a uniform, efficient, and controlled contact between a fluid and an extended surface.

It will be immediately recognized that efficient systems for the contact of fluent materials with extended surfaces are of fundamental importance in the present state of technological development. Fluids are contacted with extended surfaces to effect an energy and/or mass transfer therebetween. Systems contacting fluids with extended surfaces for the purpose of energy transfer are basic to the fields of heat transmission and refrigeration while systems contacting fluids with extended surfaces for the purpose of mass transfer find application in the fields of absorption-desorption, humidification-dehumidification, solvent extraction, dialysis, drying, evaporation, mixing, material transport, and others.

Whether the purpose in contacting a fluid with a surface is to achieve energy transfer, mass transfer, or a combination of the two, the problems encountered in distributing the fluid to the surface are similar. An initial consideration is to insure that all portions of the fluid contact the surface. When a body of fluid is flowing parallel to a surface under laminar flow conditions, the fluid may be effectively insulated from the surface by a thin layer of stagnant fluid moving at near zero velocity. The mass and/or energy transfer is limited to that which can effectively penetrate the stagnant film. One solution is to employ turbulent fluid flow insuring contact of the surface with all portions of the fluid. Turbulent as opposed to laminar flow may, however, be imparted to a given fluid only by the utilization of relatively high pressure and velocity ranges.

An alternate expedient to insure total fluid contact with a surface, applicable to both laminar and turbulent flow, is to circulate fluid in contact with a surface over a tortuous or circuitous flow path. This expedient likewise has certain inherent disadvantages. Flow paths sufficiently tortuous or circuitous to allow total fluid contact may produce undesirably high pressure losses. Further, when fluid is contacted with a surface of substantial areal extent, the fluid may not act uniformly upon all portions of the surface. In the case of mass or energy transfer between a surface and a body of fluid confined to a circuitous flow path, an efficient transfer may be achieved between the fluid and surface upon initial contact but upon exit of the fluid from the circuitous flow path the fluid and surface may be substantially in equilibrium and no net transfer obtainable. In the case of combined energy and mass transfer, both the direction and rate of transfer may vary in passage along a circuitous flow path. For example, when a dry, warm fluid is contacted with a moist, cool surface, energy will transfer to the surface upon initial contact with the fluid while mass will transfer from the surface to the fluid. Upon exit of the fluid from a circuitous flow path, the fluid may be at a temperature approaching that of the surface and at such reduced temperature the fluid may transfer mass in the form of condensate to the surface.

Numerous fluid distribution systems are known to the art. Some distribution systems are inefficient in that they provide only partial contact between a fluid body and an extended surface. Other distribution systems require turbulent flow for efficient operation and are accordingly confined to high pressure, high velocity applications. Still other distribution systems achieve efficient fluid contact with an extended surface only at the expense of high pressure losses. Relatively few fluid distribution systems are capable of providing uniform fluid contact with an extended surface, and still fewer are capable of controlling the total contact of any given unit of fluid. Finally, few fluid distribution systems are adaptable to use with surfaces of significantly differing areal extent.

An appreciation of the variables which must be satisfied by a successful fluid distribution system is best imparted by reference to fuel cells as a specific example. Fuel cells typically employ two electrodes separated by an electrolyte. Fuel and oxidant are separately circulated to the electrodes in fluid form thereby producing a potential difference between the electrodes. Obviously, the circulated fluid must completely and uniformly contact the electrodes in order to obtain maximum efficiency. Further, the pressure of the circulated fluids at every point on the face of the electrodes must be controlled. Low pressures on one side of the fuel cell may allow electrode flooding while unduly high pressures may cause mechanical damage. Reaction products may be formed at either or both of the electrodes. These must be removed from the electrodes to allow efficient contact of the circulated fluids with the electrodes. Slow removal of reaction products may in some instances produce flooding and unduly high rates of reaction product removal may adversely affect the electrolyte leading to reduced efficiency and mechanical failure. The reaction of fuel and oxidant within the cell liberates heat and generates higher than ambient temperatures. These temperatures may speed the degradation of the ion exchange materials which may form the electrolyte. Consequently, the fluid distribution system must provide uniform fluid circulation to dissipate the heat of reaction. The fluid distribution system must circulate fluid to meet the above requirements with minimal pressures, velocities, and pressure drops. High flow rates will lead to wastage of fuel or oxidant while high pressures may produce mechanical failures of fuel cell elements. High pressure losses undesirably increase power requirements for fluid circulation. Inasmuch as the current output of a fuel cell is directly related to the areal extent of the electrode surfaces, it is desirable that any fluid distribution system for fuel cell application be adaptable to uniform and controlled fluid contact over extended surfaces of widely differing areas.

It is an object of the present invention to provide a new and improved fluid distribution element capable of impinging fluid with minimal pressure losses over substantially all of an extended surface.

It is an object of the invention to provide a new and improved fluid distribution system allowing a uniform, efficient, and controlled contact between a fluid and an extended surface for the purposes of energy transfer, mass transfer, or combined energy and mass transfer.

It is an object of the invention to provide a fluid distribution system capable of efficient performance with extended surfaces of significantly differing areal extents.

It is an object of the invention to provide new and improved heat exchangers, humidifiers, dehumidifiers, and other devices capable of effecting energy and/or mass transfer between a surface and a fluid.

It is a specific object of the invention to provide a fluid distribution system applicable to fuel cells and energy and/or mass transfer systems associated therewith.

It is a still further object of the invention to provide a new electrical generating system and a process of circulating fluid thereto.

These and other objects of my invention are accomplished by providing a fluid distribution system utilizing a high aperture density perforate sheet shaped to provide fluid directing channels. The channel walls of the sheet are inclined at an acute angle with respect to the extended surface desired to be contacted, whereby the fluid directed by the sheet efficiently and uniformly impinges the extended surface. The apertures of the perforate sheet are formed in nozzle configuration to efficiently deliver the fluids with minimal energy losses. Auxiliary imperforate sheets and plugs are employed in conjunction with the perforate sheet to completely confine and direct the fluid flow with respect to the apertures and channels. Numerous specific arrangements involving one or more perforate sheets, imperforate sheets and plugs in combination with fluid pervious and impervious surfaces for the purpose of energy transfer, mass transfer, or a combination of energy and mass transfer are included within the purview of the invention.

Other objects and improvements included within the invention will be clear from the following description and claims taken with the accompanying drawings wherein:

FIGURE 1 is a face view, greatly magnified, of perforate sheet material;

FIGURE 2 is a face view, greatly magnified, of a modified perforate sheet material;

FIGURE 3 is a sectional view, greatly magnified, of an aperture in the perforate sheet material;

FIGURE 4 is a sectional view, greatly magnified, of an alternate type aperture in the perforate sheet material;

FIGURE 5 is a perspective view of a channeled perforate sheet;

FIGURE 5A is a perspective view of the channeled perforate sheet of FIGURE 5 additionally including absorbent material;

FIGURE 6 is a perspective view of a perforate sheet having an alternate channel configuration;

FIGURE 6A is a perspective view of the channeled perforate sheet of FIGURE 6 including absorbent material;

FIGURE 7 is a perspective view of a perforate sheet having a modified channel configuration;

FIGURE 7A is a perspective view of a channeled perforate sheet including absorbent material;

FIGURE 8 is a perspective view of a perforate sheet having a composite channel configuration;

FIGURE 8A is a perspective view of a compositely channeled perforate sheet including absorbent material;

FIGURE 9 is a perspective view of an alternate compositely channeled perforate sheet;

FIGURE 9A is a perspective view of an alternate compositely channeled perforate sheet including absorbent material;

FIGURE 10 is a perspective view of a perforate sheet assembly;

FIGURE 11 is a perspective view showing the perforate sheet assembly of FIGURE 10 inverted;

FIGURE 31 is a plan view of a fuel cell;

FIGURE 32 is a front elevation of a fuel cell;

FIGURE 38 is a perspective view with portions shown in section and portions broken away of a fuel cell detail;

FIGURE 39 is an elevation, partly in vertical section, of an energy and/or mass transfer apparatus;

FIGURE 40 is an elevation, partly in vertical section, of a humidifier; and

FIGURE 41 is a schematic illustration of an electrical power generation system.

Figure 12:
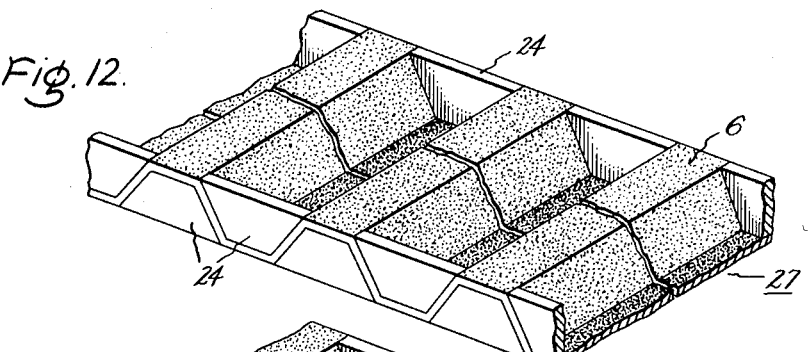
FIGURE 12 is a perspective view of an alternate perforate sheet assembly.

The advantages of the present invention are obtained by constructing fluid distribution systems from perforate sheet material. In FIGURE 1 a perforate sheet 1 is shown greatly enlarged provided with perforations 2 which are arranged in a triangular spacing. The triangular spacing separates each perforation from all adjacent perforations by a uniform distance $a$. This arrangement allows maximum perforation density, since crowding of perforations does not weaken the sheet along any particular line of hole centers. Further, uniform perforation spacing minimizes non-perforate sheet area not contributing to over-all sheet strength.

The advantages of the FIGURE 1 perforation spacing are best illustrated with reference to FIGURE 2, which shows a four-spot hole spacing pattern. In FIGURE 2, the perforations in any horizontal row are separated by a distance $a$ equivalent to the spacing in FIGURE 1. It will be noted that the spacing $b$ in a vertical direction is somewhat smaller than the spacing $a$ thereby leaving the sheet weakened along any vertical line of centers. Further, an increased spacing $c$ is formed between diagonally adjacent perforations thereby wasting surface area and restricting the perforation density.

While the spacing of the perforations 2 shown in FIGURE 1 is preferred, any desired hole spacing may be employed. Variable perforation size and spacing may also be employed. Further, it may be desirable to omit perforations altogether in any portion of the sheet material not intended to perform a fluid transfer function in the fabricated system.

An additional feature of the material is the cross-sectional configuration of the perforations. Fluid pressure losses in passing through the perforations are minimized by employing nozzle shapes. FIGURE 3 shows a perforation configuration which may either provide a converging or diverging nozzle effect, depending on the direction of fluid flow. The perforation 2 is provided with a throat 3 adjacent one face of the sheet. FIGURE 4 shows an alternate form of perforation 4 which has a converging-diverging or Venturi configuration provided by a throat 5 spaced from each edge of the sheet 1. The nozzle configuration is of importance in that it allows efficient transport of fluid through the sheet material without excessive energy losses. Also, the nozzles efficiently convert the pressure energy of the fluid on one side of the material to velocity energy upon transport thorugh the nozzle.

The perforate sheet material possesses the distinct advantage in that it may be fabricated from imperforate shetet material using conventional photoetching techniques. Conventional etchants upon contact with one face of a sheet will generate the nozzle configuration shown in FIGURE 3. When etchants are applied to opposed surfaces of the sheet, nozzle configurations of the type shown in FIGURE 4 can be obtained. Etched perforations avoid the sharp corners, burrs, and sheet distortions associated with mechanical perforations. Further, photoetched perforate sheets may be created with greater hole density and smaller hole size than is possible with mechanical processes.

In testing fuel cells and certain associated transfer apparatus, it was determined that perforate sheet material having a hole density of 5–50 percent by volume was useful. In these tests, sheet thicknesses and hole sizes of 0.003 to 0.010 inch were found desirable. Sheets having 160 to 180,000 holes per square inch were found suitable for use. Preferred sheet materials contained 2,000 to 15,000 holes per square inch and a hole density of 10–35 percent. While these particular values of sheet thickness, hole sizing and hole density have been found suitable for fuel cell related applications, it will be appreciated that the invention is not dimensionally limited but is directed generally to etched sheets of high hole density. For purposes of clarity the terms "high hole density" and "high perforation density" are intended to designate materials having greater than approximately 160 perforations per square inch. Such photoetched materials are clearly distinct from conventional mechanically perforated sheet material.

The perforated sheet material is prepared for fluid distribution system use by corrugating. FIGURE 5 shows a preferred corrugation configuration providing channels on opposite sides of the material. Since the perforations are preferably too small and numerous to be conveniently individually illustrated, the perforations are schematically indicated by stippling in this and all subsequent figures which illustrate perforate corrugated sheets. The channeled sheet material 6 is provided with a plurality of first portions 7 in one plane and a plurality of second portions 8 in a parallel plane. The first and second portions are connected by sloping ribs 9. A first portion 7 together with the two contiguous ribs 9 form a downwardly opening channel while the second portion 8 together with two connecting ribs form an upwardly opening channel. The ribs are sloped with respect to the horizontal by an angle theta. In preferred configurations, the angle theta should lie within the range of 20–87 degrees. A 45° angle is most preferred. As illustrated in FIGURE 5A, the channeled sheet 6 may be provided with absorbent material 10 mounted in the downwardly opening channel or corrugation. The absorbent material may find utility in mass transfer applications as a condensing or diffusion surface for fluid being handled. For fuel cell applications, it is preferred that portions 7 be ¼ to ½ inch in width.

An alternate corrugation configuration is illustrated in FIGURE 6, in which channeled sheet 1 is formed of connecting ribs 12. The connecting ribs form alternating upwardly and downwardly opening channels similarly as the configuration of FIGURE 5. In FIGURE 6A the mounting of absorbent material 13 is illustrated. Another corrugation configuration is illustrated in FIGURE 7 in which a channeled sheet 14 is formed of upwardly and downwardly curving portions 15. The curved corrugations form channels related similarly as those shown in FIGURES 5 and 6. In FIGURE 7A the channeled sheet 14 is shown with absorbent material 16 mounted in a downwardly opening channel.

As shown in FIGURES 5–7, inclusive, the upwardly and downwardly opening channels are identical. It will be apparent that if perforations of the type shown in FIGURE 3 are formed in the sheet material, a choice of converging or diverging nozzles may be had merely by inverting the material. It will additionally be appreciated that the dimensions and perforations of the upwardly facing channels may be varied with respect to the downwardly opening channels such that opposite sides of the material will not be equivalent. Further, absorbent material may be mounted in upwardly opening channels, if desired, rather than downwardly opening channels as show. Also, the perforations need not have the same configuration in opposite sides of the channels.

While three distinct corrugation configurations have been shown in FIGURES 5–7, inclusive, it will be apparent that the invention is not limited to any particular configuration. For the practice of the invention, it is merely necessary that the perforate sheets be corrugated. For purposes of further illustrating the breadth of the invention, corrugation configurations are shown in FIGURES 8 and 9 which are composites of the configurations shown in the preceding figures. In FIGURE 8, a channel sheet 17 is formed of first portions 18 connected by ribs 19. The mounting of absorbent material 20 is shown in FIGURE 8A. In FIGURE 9 a channeled sheet is shown formed of curved portions 22 connected by portions 23. Absorbent material 24 is shown in FIGURE 9A. Channeled sheets 17 and 21 when inverted illustrate still different configurations within the scope of the invention.

Perforate sheet assemblies for use in fluid distribution systems may be formed by suitably plugging the channels or corrugations of any one of the channel sheets shown in FIGURES 5–9, inclusive. For purposes of illustration, perforate sheet assemblies will be described with respect to channeled sheet 6.

FIGURES 10 and 11 illustrate a preferred perforate sheet assembly 26. Both ends of all channels opening upwardly in FIGURE 11 are shown closed by plugs 24. In FIGURE 10, every upwardly opening channel is shown plugged at one end. Adjacent channels are shown plugged at opposite ends. The perforate sheet assembly 26 is shown with parts broken away to illustrate that it may be proportioned to conform to any desired areal extent.

Figure 13:
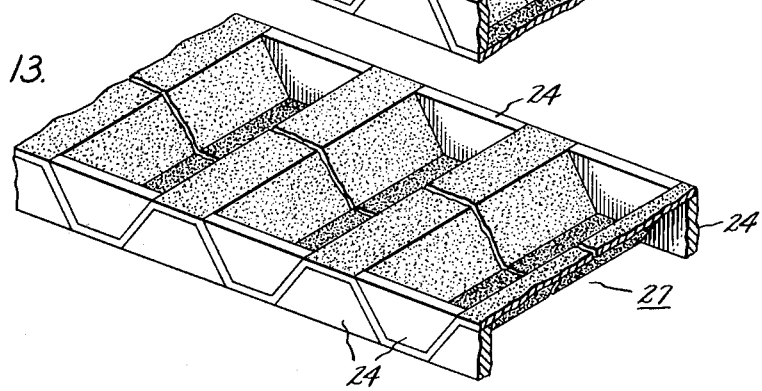
FIGURE 13 is a perspective view showing the alternate perforate sheet assembly of FIGURE 12 inverted.

FIGURES 12 and 13 illustrate an alternate perforate sheet assembly 27 which is similarly formed of channeled sheet material 6. Plugs 24 close each end of each channel of the assembly. Assembly 27 is similarly shown with parts broken away to illustrate its adaptability to widely varying a real extents.

Figure 14:
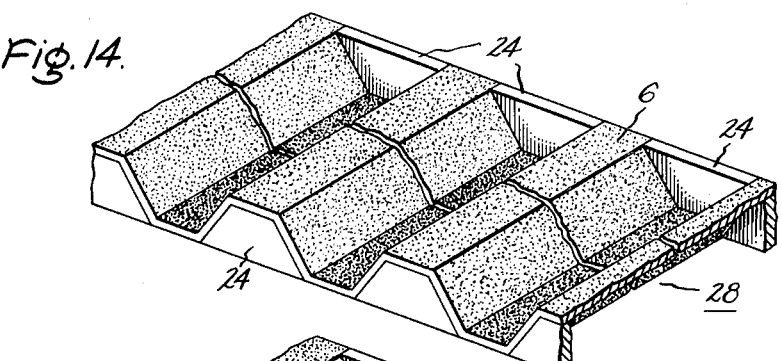
FIGURE 14 is a perspective view of an alternate perforate sheet assembly.
Figure 15:
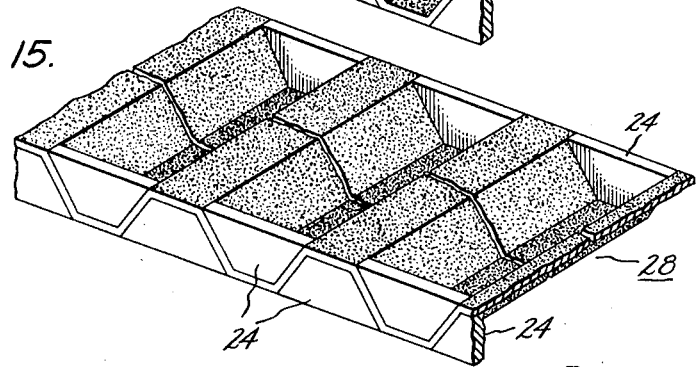
FIGURE 15 is a perspective view of the alternate perforate sheet assembly of FIGURE 14 inverted.

FIGURES 14 and 15 illustrate a perforate sheet assembly 28 which is formed from channeled sheet material 6. All channels are plugged at one end of the assembly and all channels extending in a single direction are plugged at the opposite end of the assembly.

Figure 16:
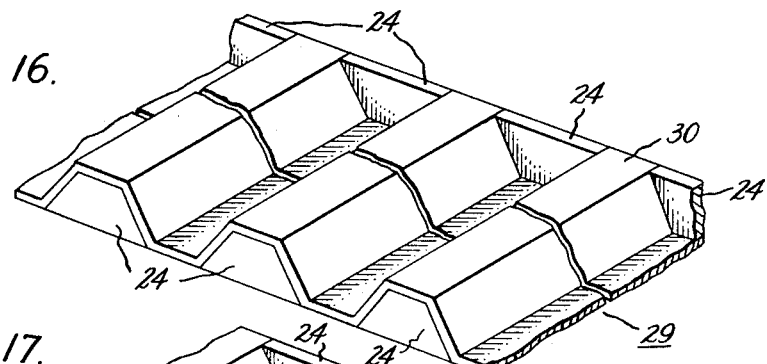
FIGURE 16 is a perspective view of an imperforate sheet assembly.
Figure 17:
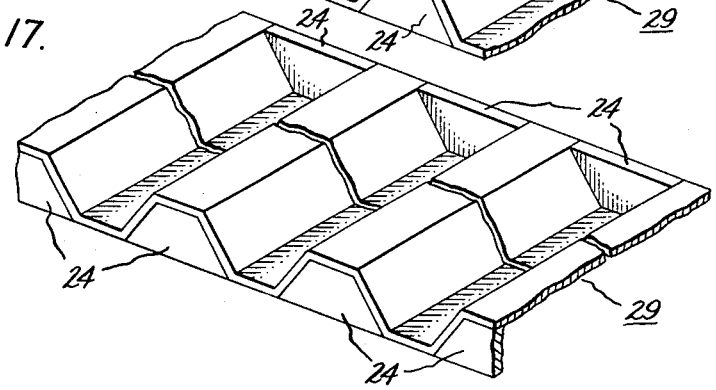
FIGURE 17 is a perspective view of the imperforate sheet assembly of FIGURE 16 inverted.

FIGURES 16 and 17 illustrate an imperforate sheet assembly 29 designed to be used in combination with the perforate sheet assembly 28 of FIGURES 14 and 15. A channeled imperforate sheet 30 is provided with all upwardly facing channels closed by plugs 24 at one end of the assembly and all downwardly opening channels closed by plugs 24 at the other end of the assembly.

Figure 18:
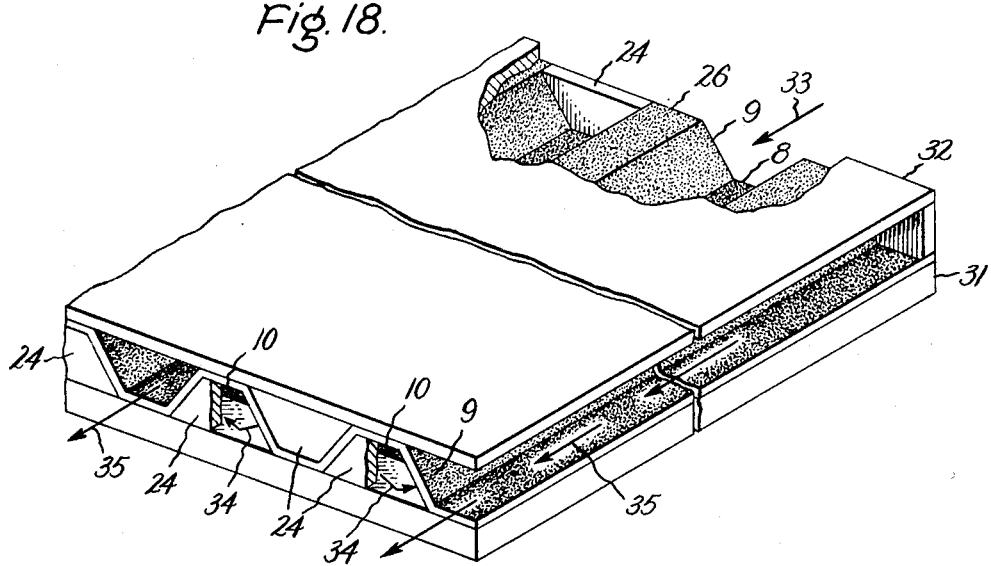
FIGURE 18 is a perspective view of a fluid distribution system.

Utilization of the preferred perforate sheet assembly 26 of FIGURES 10 and 11 in a fluid distribution system is illustrated in FIGURE 18. Sheet 31 represents a transfer surface of any desired areal extent across which it may be desired to transfer either fluent mass or energy or a combination of fluent mass and energy for any one of a myriad of industrial purposes.

The perforate sheet assembly is mounted adjacent the sheet 31 with the same general orientation as shown in FIGURE 10. An imperforate plate 32 is mounted on the assembly 26. The sheet 31 closes the downwardly opening channels while the sheet 32 closes the upwardly opening channels.

Fluid enters the distribution system at one end through an unplugged upwardly opening channel as indicated by arrow 33. Fluid may flow the entire length of the channel without encountering any substantial pressure drop but is prevented from flowing completely through the distribution system in the upwardly opening channel by a plug 24 placed at the end of the channel opposite to fluid entrance.

Inasmuch as the fluid pressure is substantially uniform throughout the length of the fluid entrance channel, fluid will uniformly penetrate the perforate ribs 9 forming each side of the channel. Some transfer between the sheet 31 and the fluid circulated may be effected through the perforate portion 8 forming the base of the upwardly opening fluid entrance channel, however, the principal situs of mass and/or energy transfer is in the downwardly opening channels.

The circulated fluid in penetrating the ribs 9 is directed downwardly at an acute angle with respect to the sheet 31 through nozzles of the type described in connection with FIGURES 1–4, inclusive. These nozzles effectively convert the pressure energy in the entrance channels to velocity energy causing impingement of the circulated fluid with the upper surface of the sheet 31 as illustrated by arrows 34. Inasmuch as the fluid uniformly penetrates the perforate ribs 9 a uniform impingement on the sheet 31 is obtained. The fluid is transported from the downwardly opening channels through oppositely sloped perforate ribs 9. The downwardly opening channels in FIGURE 18 (upwardly opening channels in FIGURE 11) are plugged at each end such that flow through the channels is completely lateral. It will be noted that the sizing of the channels may be controlled independently of the areal extent of the surface 31. Proper choice of channel size can effectively control the duration of direct fluid impingement on the sheet 31. Fluid is exhausted from the distribution system through every other upwardly opening channel as indicated by flow arrows 35.

As an optional feature, absorbent material 10 is shown mounted in the downwardly opening channels. Such material may substantially increase the effectiveness of the apparatus in certain mass transfer applications. As a specific example, the fluid distribution system may be used to entrain water vapor supplied from a source beneath a pervious sheet such as 31. Water may be present on the surface of the sheet 31 as condensate ready to be picked up by the circulated fluid. By provision of absorbent material 10, water may diffuse from the surface of the sheet 31 and condense in the material 10. Circulated fluid may then pick up condensed water from the combined areas of the sheet 31 and the absorbent material 10 thereby functioning to remove water at a rate accelerated over that which could be maintained if absorbent material 10 were not present.

Figure 19:
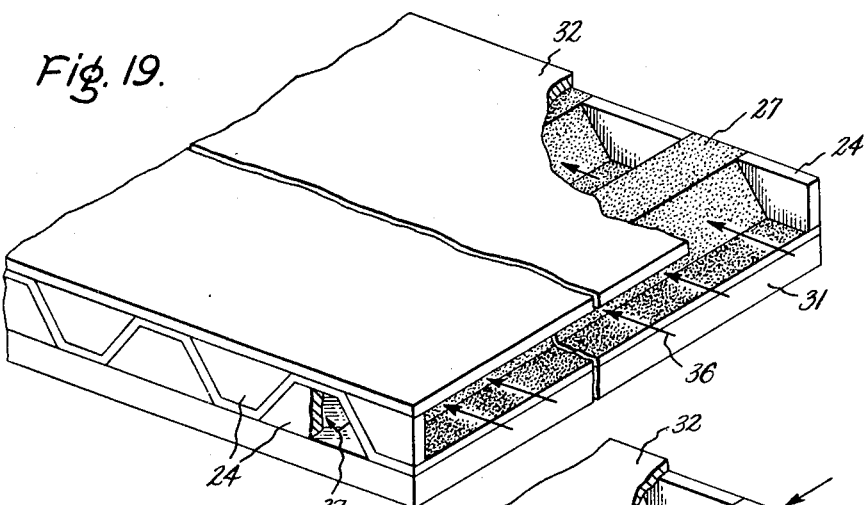
FIGURE 19 is a perspective view of an alternate fluid distribution system.

FIGURE 19 illustrates an alternate fluid distribution system utilizing the perforate sheet assembly 27 shown in FIGURES 12 and 13 with an imperforate sheet 32 mounted above the assembly and a sheet 31 representing a transfer surface mounted below the assembly. Plugs 24 completely block the channel ends such that only lateral or cross-channel fluid flow is possible. Fluid entering the apparatus flow as illustrated by arrows 36. Upon impingement of the fluid with the rib 9, the nozzles in the perforate sheet material direct fluid flow downwardly into impingement with the upper surface of the sheet 31 as indicated by arrow 37. Fluid subsequently exits from the downwardly opening channel through oppositely sloping rib 9.

It will be apparent that the fluid distribution system of FIGURE 19 may be of any desired channel length, since flow characteristics are completely independent of channel length. The number of channels through which the fluid may be circulated will be limited by conventional equilibria and pressure drop considerations. While incapable of indefinite cross-channel extension, the FIGURE 19 distribution system possesses the distinct advantage of impinging fluid with equal efficiency on both sheets 31 and 32. This form of the invention accordingly may be preferred in applications wherein both imperforate sheets 31 and 32 are utilized as transfer surfaces.

Figure 20:
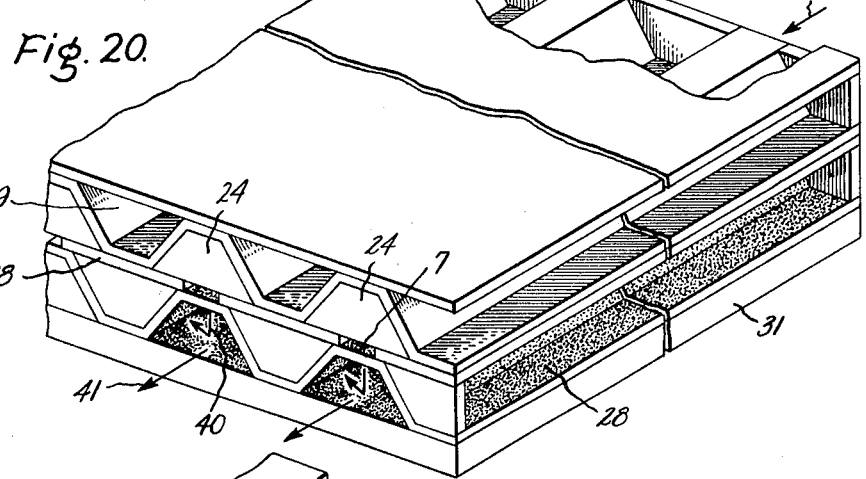
FIGURE 20 is a perspective view of an alternate fluid distribution system.

FIGURE 20 illustrates a third possible fluid distribution system. The surface across which it is desired to transfer energy and/or mass is represented by sheet 31. The perforate sheet assembly 28 shown in FIGURES 14 and 15 is mounted on the transfer surface. The imperforate sheet assembly 29 shown in FIGURES 16 and 17 is mounted on the assembly 28 with imperforate strips 38 interposed. The imperforate strips 38 are of slight thickness such that any space left below plugs 24 bridging adjacent strips allows only nominal fluid leakage. If desired, additional sealants or plugs may be employed to provide a positive fluid seal between imperforate assembly 29, strips 38, and perforate sheet assembly 28. Imperforate sheet 32 is shown mounted on imperforate sheet assembly 29 as an optional element. The imperforate sheet 32 in this embodiment does not direct fluid flow but may be desirable in adjacently mounting plural assemblies.

Fluid enters the FIGURE 20 distribution system as indicated by flow arrows 39. The fluid travels the entire length of the imperforate channels without substantial pressure loss. Fluid penetrates the portion 7 of the perforate sheet material spaced above the transfer surface 31. The nozzles of the perforate sheet material impinge jets of fluid perpendicularly on the sheet 31 as indicated by the arrows 40. Fluid exits from the system longitudinally of the downwardly opening perforate channels as indicated by flow arrows 41. The longitudinal flow of fluid in the downwardly opening fluid channels imposes equilibria limitations on the length of channels which may be employed in any given application, however, the pressure drop in the fluid distribution system will not be adversely affected by extending either the length of channels or their number. Further, while fluid impingement with the transfer surface at an acute angle is generally preferred, perpendicular impingement may be desirable, as for example, when it is desired to control the rate of mass transfer through the sheet 31.

Figure 21:
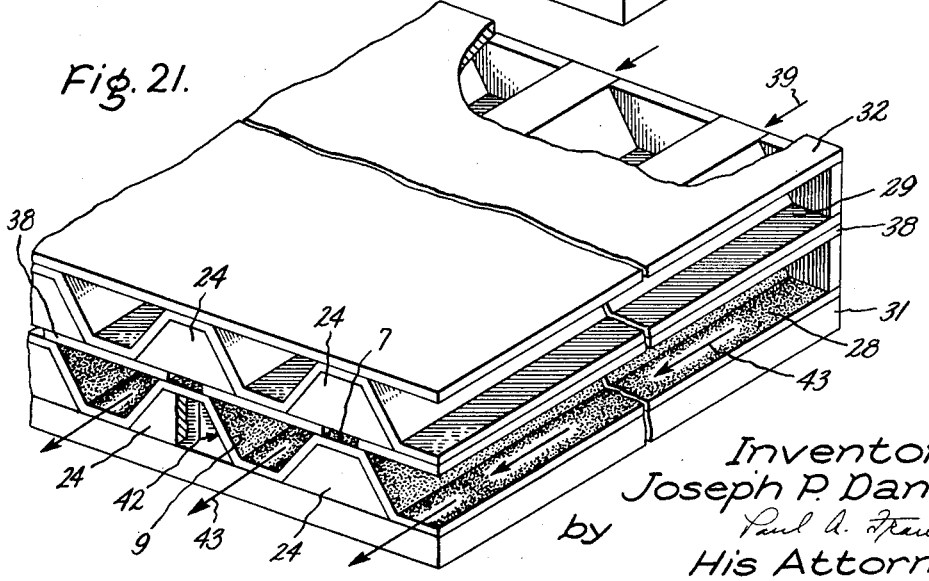
FIGURE 21 is a perspective view of an alternate fluid distribution system.

A more preferred fluid distribution system is illustrated in FIGURE 21, which is the same group of elements described in FIGURE 20 modified only by the inversion of perforate sheet assembly 28. Fluid flow arrows 39 illustrate the flow of fluid longitudinally of the downwardly opening imperforate channels. Fluid flows through the imperforate channels substantially free of pressure losses and through the nozzles in the spaced portion 7 of the perforate sheet material to impinge perpendicularly on the upper surface of the sheet 31. Contrary to the system of FIGURE 20, the fluid exits from the downwardly opening perforate channels laterally through sloping ribs 9 and is exhausted longitudinally of the upwardly opening channels as indicated by flow arrows 43. The fluid distribution system of FIGURE 21 is applicable to surfaces of extended length and width, since the flow characteristics are independent of the number of channels employed and since pressure drop within the distribution system is substantially independent of channel length.

The fluid distribution systems described in connection with FIGURES 18–21, inclusive, are illustrative of the invention. Numerous functionally equivalent forms of the invention not specifically shown will be readily apparent to one skilled in the art. The fluid distribution system may be constructed of any of the perforate sheet materials described in connection with FIGURES 1–4, inclusive. Further, the sheets may take any of the forms of corrugation disclosed in connection with FIGURES 5–9, inclusive, with or without the absorbent material shown in FIGURES 5A–9A, inclusive. While plugs 24 in FIGURES 10–21, inclusive, have been shown as separate structural elements, it will be appreciated that adjoining plugs may be formed as unitary elements and that plugs may be formed of adhesive or sealant materials lacking precise dimensions. Further, instead of employing open ended channels as indicated, it may be desirable to mount conduits at the channel termini as illustrated in FIGURES 33–37 inclusive. With the assemblies of FIGURES 10–17, inclusive, and the distribution systems of FIGURES 18–21, inclusive, are preferred, various combinations offering modified flow patterns are within the contemplation of the invention.

The distribution systems shown in FIGURES 18–21, inclusive, may be characterized as single face distribution systems, since they lie entirely on one side of the transfer sheet. Energy or mass is applied to the opposite face of the sheet by means other than the distribution system of the invention. It may be desired to direct fluid to both faces of the transfer sheet 31 using a distribution system constructed according to the present invention. Opposed face distribution systems are schematically illustrated in FIGURES 22–26, inclusive.

Figure 22:
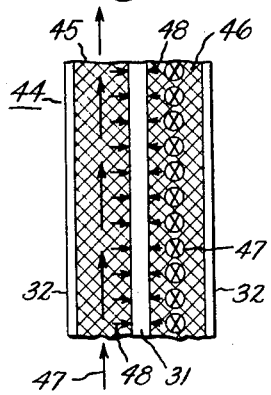
FIGURE 22 is a schematic view of an opposed face fluid distribution system.
Figure 23:
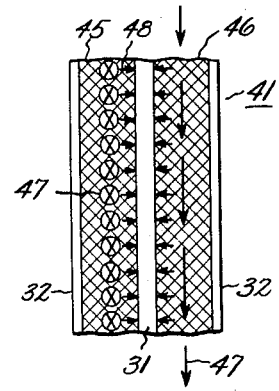
FIGURE 23 is a view similar to FIGURE 22 showing the fluid distirbution system rotated 90 degrees.
Figure 24:
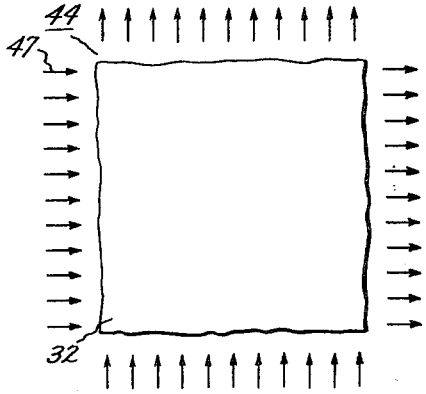
FIGURE 24 is a face view of the opposed face fluid distribution system shown in FIGURE 22.

FIGURES 22–24, inclusive, schematically illustrate a detail of a cross-current opposed face fluid distribution system 44. Sheet 31 represents a barrier through which it is desired to transfer energy, mass, or a combination of energy and mass. The sheet may be mass permeable or impermeable. Mounted on opposite faces of the sheet 31 are channeled sheet assemblies 45 and 46 which are adjacent imperforate sheets 32. Channeled sheet assemblies 45 and 46 are schematically illustrated to indicate that they may be independently chosen from any of the arrangements of channeled sheets previously described. The orientation of the channeled sheet assemblies 45 and 46 with respect to the sheet 31 is indicated by large displacement arrows 47 and small impingement arrows 48. As illustrated in FIGURE 22, the channeled sheet assembly 45 is oriented to displace fluid upwardly and to impinge fluid to the right against sheet 31. Displacement arrow 47 in FIGURE 22 corresponds to displacement arrows 39 and 43 in FIGURE 21, for example, while impingement arrow 48 corresponds to impingement arrow 42 in FIGURE 21. As illustrated by the symbol ×, channeled sheet assembly 46 is oriented such that fluid displacement is perpendicular to the plane of FIGURE 22 and in a direction away from the viewer.

FIGURE 23 illustrates the same cross-current distribution system but rotated 90 degrees.

FIGURE 24 is a face view of the detailed distribution system 44 clearly illustrating the cross-displacement.

Figure 25:
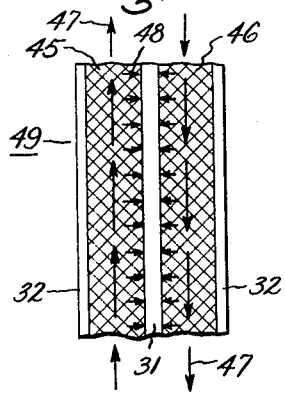
FIGURE 25 is a schematic view of an alternate opposed face fluid distribution system.

FIGURE 25 similarly illustrates a counter-current opposed face distribution system 49. The counter-current distribution system may be of the same general character as the distribution system described with respect to FIGURES 22–24, inclusive, except that the channeled sheet assemblies 45 and 46 have been relatively oriented to displace fluid in opposed directions.

Figure 26:
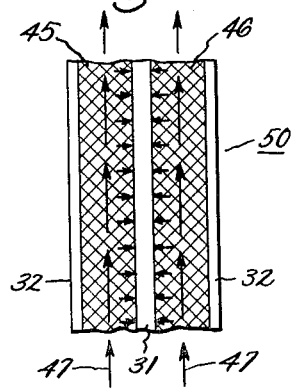
FIGURE 26 is a schematic view of an alternate opposed face fluid distribution system.

Similarly, FIGURE 26 illustrates a concurrent opposed face distribution system 50. Channeled sheet assemblies 45 and 46 are relatively oriented to displace fluid in the same direction. It will be appreciated that in addition to cross-current, counter-current, and concurrent transfer devices, channeled sheet assemblies may be oriented diagonally or in positions intermediate those disclosed.

In addition to devices which employ a plurality of channeled sheet assemblies impinging fluids in opposite directions, it is contemplated to employ a plurality of channeled sheet assemblies impinging fluid in a single direction. Fluid distribution systems stacked in this manner are schematically illustrated in FIGURES 27–30, inclusive.

Figure 27:
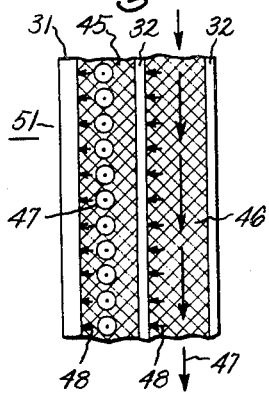
FIGURE 27 is a schematic view of a cross-current single face fluid distribution system.
Figure 28:
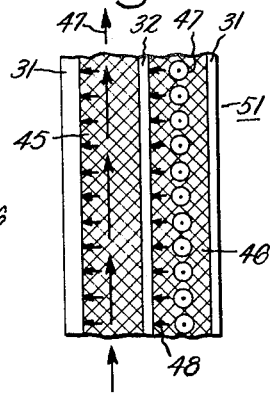
FIGURE 28 is a view similar to FIGURE 27 showing the distribution system rotated 90 degrees.

FIGURES 27 and 28 schematically illustrate a cross-current single face fluid distribution system 51. Channeled sheet assembly 45 is mounted adjacent sheet 31 providing an energy and/or mass transfer surface. The direction of fluid impingement is toward the sheet 31 as indicated by the arrows 48. The direction of fluid displacement in sheet assembly 45 is schematically indicated in FIGURE 27 by the symbol ⊙ which indicates fluid flow perpendicular to the plane of the drawing and in a direction toward the viewer. In FIGURE 28, which shows the device rotated 90 degrees with respect to FIGURE 27, the direction of fluid displacement in channeled sheet assembly 45 is directed upwardly. Channeled sheet assembly 46 is spaced from sheet assembly 45 by an imperforate sheet 32. Direction of fluid impingement as indicated by the arrows 48 is toward the interposed imperforate sheet 32. The direction of fluid displacement in the channeled sheet assembly 46 is downwardly in FIGURE 27, and in FIGURE 28 perpendicular to the plane of the drawing in a direction toward the viewer. An imperforate sheet 32 may be provided adjacent the fluid sheet assembly 46 surface remote from the channeled sheet assembly 45.

Figure 29:
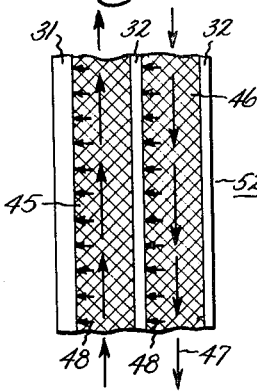
FIGURE 29 is a schematic view of a counter-current single face fluid distribution system.
Figure 30:
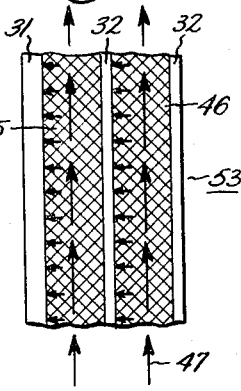
FIGURE 30 is a schematic view of a concurrent single face fluid distribution system.

FIGURES 29 and 30 schematically illustrate single face fluid distribution systems 52 and 53, respectively. Distribution systems 52 and 53 are essentially similar to fluid distribution system 51, differing therefrom merely by the orientation of distribution system 46 with respect to distribution system 45. FIGURE 29 illustrates a counter-current fluid displacement pattern whereas FIGURE 30 illustrates a concurrent fluid displacement pattern. Diagonal and other intermediate relative orientations of the channeled sheet assemblies are contemplated.

In addition to the basic arrangements shown in FIGURES 22–30, inclusive, greater combinations of channeled sheet assemblies may be employed which are inclusive of one or more of the system shown. For example, it may be desired to deliver fluid to and remove fluid from a permeable sheet 31 using either systems 44, 49, or 50. Additional channeled sheet assemblies may be mounted adjacent the imperforate sheets 32 of one or both of the systems 44, 49, or 50 for the purposes of transferring energy from the fluid circulated to the permeable sheet 31.

The invention is readily adaptable to any one of a wide variety of specific applications where the distribution of fluids for mass and/or energy transfer purposes is desired. The distribution systems within the scope of invention are not limited to use with fluids, but are amenable to the transport of any material in fluent form which will not bridge the perforations in the sheet material. While it is considered that the applicability of the fluid distribution systems disclosed will be readily apparent to one skilled in the art, nevertheless, for the purposes of further illustration, certain specific applications of the distribution systems are described. In addition, certain unobvious features and combinations relating to fuel cells are specifically disclosed.

FIGURES 31 and 32 illustrate a preferred fuel cell 100 constructed according to the present invention. The cell is held together by tie-bolt assemblies 101 extending between end plates 102 and 103. Mounted adjacent the end plate 102 is a channeled perforate sheet assembly 104. A fluent fuel may be supplied to the assembly 104 through inlet fuel conduit 105. Exhaust conduit 106 may be employed to discharge fuel or to purge the assembly. Fuel flow through conduits 105 and 106 may be controlled by valves, not shown. An electrolyte 107 provided with catalytic material 108 on opposed faces thereof is mounted adjacent the perforate sheet assembly 104. A channeled perforate sheet assembly 109 is mounted adjacent the electrolyte 107. Inlet oxidant conduit 110 delivers oxidant to the assembly 109 while oxidant and cell reaction products may be exhausted through conduit 111. A channeled perforate sheet assembly 112 faced with imperforate sheet 113 is mounted adjacent the oxidant assembly 109. Coolant is supplied to the assembly 112 through conduit 114 and exhausted through conduit 115.

Fuel assembly 104, electrolyte 107, oxidant assembly 109, and coolant assembly 112 together form a single cell of the apparatus as indicated by reference numeral 116. A fuel cell having the desired voltage or current characteristics may be built up controlling the number of cells employed.

Figure 33:
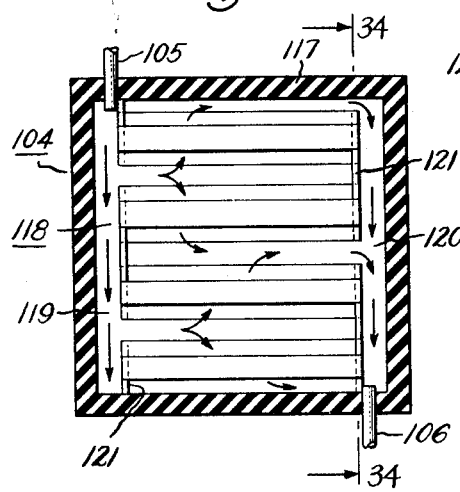
FIGURE 33 is a face view of a perforate sheet assembly.
Figure 34:
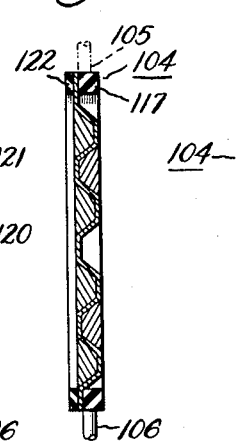
FIGURE 34 is a sectional view of the perforate sheet assembly of FIGURE 33 taken along section lines A—A.
Figure 35:
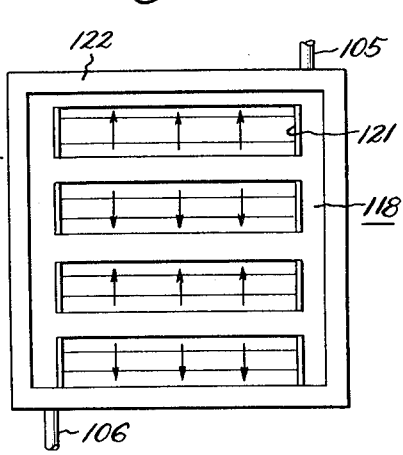
FIGURE 35 is a face view of the perforate sheet assembly of FIGURE 33 rotated 180 degrees.

Fuel assembly 104 is illustrated in FIGURES 33–35, inclusive. FIGURE 33 shows the face of the assembly 104 which would be mounted adjacent the end plate 102. Sealant material 117 is provided adjacent the periphery of the perforate sheet material 118. The central portion of the perforate sheet material is suitably corrugated or channeled. The ends of the channels are spaced from the sealant material 117 to form fluid distribution and collection channels 119 and 120, respectively. One plug 121 is provided in each end of the channels opening toward the viewer in FIGURE 33. FIGURE 35 illustrates the opposed face of the assembly 104. Sealant 122 is mounted adjacent the edge of the perforate sheet material 118. Plugs 121 are provided at each end of each channel opening toward the viewer in FIGURE 35. The plugs of the assembly 104 are arranged in a manner similar to that previously described in connection with FIGURES 10, 11, and 18.

Figure 36:
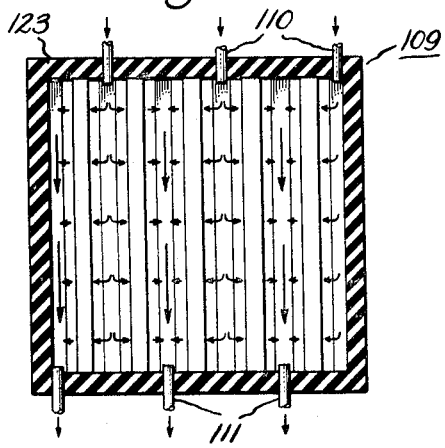
FIGURE 36 is a face view of an alternate perforate sheet assembly.
Figure 37:
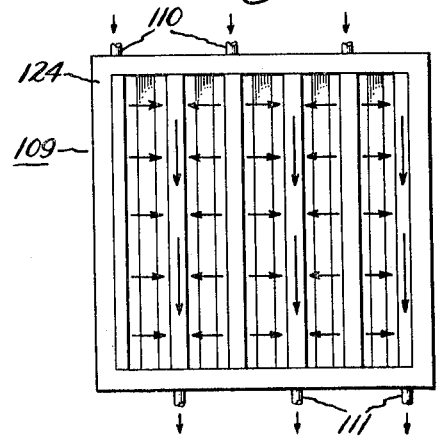
FIGURE 37 is a face view of the perforate sheet assembly of FIGURE 36 rotated 180 degrees.

FIGURES 36 and 37 illustrate the channeled perforate sheet assembly 109. FIGURE 36 illustrates the face of the assembly remote from the electrolyte 107. The assembly is comprised of perforate sheet material having sealant material 123 adjacent the periphery thereof. The portion of the perforate sheet material 122 inward of the sealant material 123 is corrugated or channeled. Inlet conduits 110 are mounted adjacent the ends of every other channel opening toward the viewer in FIGURE 36 while exhaust conduits 111 are provided in the opposite ends of the remaining conduits opening toward the viewer. The sealant 123 serves a double function as a seal for the assembly and as a plug for the channel ends. FIGURE 37 shows the face of the assembly 109 mounted adjacent the electrolyte 107. Sealant 124 serves not only as a seal but also as a plug for all channels opening toward the viewer in FIGURE 37. The flow pattern through the fluid distribution system 109 is generally similar to that previously described in relation to FIGURE 18. Coolant assembly 112 illustrated in FIGURES 31 and 32 is of the same general construction as oxidant assembly 109.

The operation of the fuel cell 100 is best understood by reference to a single cell schematically illustrated in FIGURE 38. Fuel enters the channels of fuel assembly 104 at one end through unplugged downwardly opening channels as indicated by arrow 125. Fluid may flow the entire length of the channels without encountering any substantial pressure drop but is prevented from flowing completely through the assembly in the downwardly opening channel by a plug placed at the end of the channel opposite to fluid entrance.

Inasmuch as pressure is substantially uniform throughout the length of the entrance channel, fuel uniformly penetrates the perforate ribs forming each side of the entrance channel and is directed upwardly at an acute angle with respect to the electrolyte 107. The nozzle apertures provided in the perforate sheet material effectively convert the pressure energy in the entrance channels to velocity energy causing impingement of the circulated fuel with the catalytic material 108 as illustrated by arrows 126.

Upon contact of the fuel with the catalytic material 108, it is oxidized to the ionic form by the loss of one or more valence electrons. The electrons given up by the fuel contacting the catalytic material 108 may be collected from the face of the catalytic material by the contacting portions of the distribution system 104. It will, accordingly, be appreciated that the fuel distribution system performs the additional function of current collector, which normally requires a separate structural element.

Assuming a cation permeable electrolyte, the fuel in ionic form will penetrate the electrolyte 107. Simultaneous with fuel oxidation, oxidant will enter the oxidant assembly as indicated by flow arrow 127. Oxidant will similarly be directed to impinge on the upper body of catalytic material 108 as indicated by flow arrow 128. The oxidant upon contacting the catalytic material will be reduced by the gain of electrons. Electrons for the reduction may suitably be supplied by the portions of the oxidant assembly 109 contacting the catalytic material 108. Thus, the oxidant assembly additionally functions as a current collector for the fuel cell.

Oxidant and fuel ions may react in situ. In an exemplary situation when the fluid reactant constituting the fuel is hydrogen and the fluid reactant constituting the oxidant is oxygen, the reaction product will be water. Inasmuch as the electrolyte may utilize water as an ion transport media, a portion of the water must remain in the electrolyte. However, the accumulation of excess amounts of water at the oxygen-catalyst interface will effectively insulate the oxygen from the catalyst and slow the rate of oxygen reduction and hence the rate at which electrons are transferred. Inasmuch as the oxidant assembly 109 contacts oxidant with catalytic material through cross-channel flow, the duration of oxygen contact with the catalytic material may be uniformly controlled. Accordingly, drying of the electrolyte which may lead to structural failure is avoided as well as flooding. As an optional feature absorbent material 129 is shown mounted in the downwardly opening channel and spaced from the electrolyte. A certain portion of water formed at the oxygen-catalyst interface may diffuse onto the absorbent material and recondense. The absorbent material accordingly increases the surface area and rate at which water may be diffused into the oxidant for education. Flow arrow 130 illustrates the education of oxidant from the assembly 109.

In operation, fuel cells may generate heat as well as electricity. Since high temperatures of operation will degrade the electrolyte, it may be desired to positively control operating temperatures. Coolant assembly 112 separated from oxidant assembly 109 by imperforate sheet 113 is provided for this purpose. Coolant enters the distribution system as indicated by flow arrows 131, impinges on sheet 113 as illustrated by arrows 132, and exits from the system as indicated by arrows 133. The pattern of fluid circulation is in every respect similar to that described in connection with FIGURE 18.

While fuel cell 100 as illustrated in FIGURES 31–38, inclusive, constitutes a preferred form of the invention, numerous modifications will be obvious to one skilled in the art. The fuel cell has been described in conjunction with a solid electrolyte 107, however, a conventional liquid electrolyte suitably confined between catalyst faces may alternately be employed. Although the electrolyte 107 may be either cation permeable or anion permeable, the operation has been described with reference to a cation permeable electrolyte. If an anion permeable electrolyte were employed, oxidant ions would penetrate the electrolyte and reaction products would form in the fuel distribution system and be educted thereby. In certain applications, it may be desired to cool the fuel side of the cell rather than the oxidant side. Repositioning of the coolant distribution system or the provision of coolant distribution systems in contact with both the oxidant and fuel distribution systems is contemplated.

The fuel cell components may be formed of insulative or conductive materials as desired in order to control the electrical current generated. As an example, end plates 102 and 103 of fuel cell 100 may be constructed of insulative material. The various fluid conduits external of the cell may additionally be formed of insulative material. Each of the sheets 113 adjacent the coolant assemblies 12 and remote from the oxidant assemblies 109 may be formed of electrically insulative material. In such situation, each fuel assembly 104 would serve as a cell terminal of one polarity while each oxidant assembly 109 could serve as a cell terminal of opposite polarity. The terminals of the cells may be connected in series or parallel as desired by the use of suitable wiring. In an alternate arrangement, all of the elements lying between end plates 102 and 103 may be formed of conductive materials, whereby the cells will be connected in series. In such case, utilization of the energy of the fuel cell 100 would merely require electrical connection to the fuel assembly 104 adjacent end plate 102 to the coolant or oxidant assembly adjacent end plate 103. Numerous alternate choices of insulative and conductive materials are possible, including the use of additional elements provided for the sole purposes of electrical insulation.

Each of the channeled perforate sheet assemblies 104, 109, and 112, taken together with the imperforate sheets mounted in contact with the opposed faces thereof, form a fluid distribution system equivalent to that shown in FIGURE 18. Any one of the fluid distribution systems shown mounted in the fuel cell 100 may be replaced with a fluid distribution system of the type shown in FIGURES 19–21, inclusive. Inasmuch as any one of the fluid distribution systems of FIGURES 18–21, inclusive, may be mounted in the fuel cell, it will be appreciated that the portion of the fuel cell 100 shown in FIGURE 38 lying beneath the perforate sheet assembly 112 may take the form of any one of the opposed face distribution systems 44, 49, and 50 illustrated in FIGURES 22–26, inclusive. Further, the portion of the fuel cell 100 illustrated in FIGURE 38 lying above perforate sheet assembly 104 may take the form of any one of the single face fluid distribution systems 51, 52, and 53 illustrated in FIGURES 27–30, inclusive. Other obvious structural variations in the fuel cell 100 are possible.

FIGURE 39 illustrates an apparatus 200 comprised of two portions 201 and 202 forming a housing which are joined by bolt assemblies 203. Fluid is supplied to the housing portions 201 and 202 by conduits 204 and 205, respectively. Housing portion 202 is provided with an exhaust conduit 206. Housing portion 201 is provided with two exhaust conduits 207 and 208. The housing forms a chamber mediate which is mounted a partition 209 faced with fluid pervious elements 210 on either face. Channeled sheet assemblies 211 and 212 are mounted in the housing chamber in contact with the elements 210 within housing portions 201 and 202, respectively. The channeled sheet assemblies 211 and 212 are schematically shown and may take the form of any of the assemblies shown in FIGURES 18–21, exclusive.

For the purposes of describing a specific application of the invention, apparatus 200 may be considered a humidifier-dehumidifier to which warm moist air is supplied through conduit 204 and cool, dry air is supplied through conduit 205. Warm, moist air upon entering the apparatus 200 will be displaced downwardly within the channeled sheet assembly 211 as indicated by flow arrows 213. Simultaneously, the warm air will be impinged against the pervious element 210 as indicated by impingement arrows 216. Moist air may also penetrate into the partition 209.

Simultaneously, cool, dry air will be displaced upwardly in the channeled sheet assembly 212 as indicated by displacement arrows 214 and impinged against element 210 as indicated by impingement arrows 216. The cool, dry air may penetrate the pervious element 210 and into a portion of the partition 209.

Due to the temperature differential across the apparatus, a portion of the water vapor in the warm air stream may condense within the partition 209 and upon the pervious element 210. Because of both the temperature differential and the humidity differential across the apparatus, the cool air stream upon penetrating the partition 209 may pick up a portion of the condensed water. In certain situations more water may be condensed by the humid air stream than can be diffused into the dry air stream. In such case, the excess water will migrate to the lower portion of the housing chamber and be removed through conduit 208. The entering warm, humid air upon exhaust through the conduit 207 will be at a reduced temperature and humidity. Similarly, the cool, dry entering air upon exhaust through the conduit 206 will be at an elevated temperature and humidity. Of course, humidification-dehumidification may also take place without benefit of a temperature differential between the separate air streams.

In certain instances, it may be desired to employ an impervious partition in place of the pervious partition 209 illustrated. In such instances the apparatus will function efficiently as a dehumidifier with a temperature differential across the apparatus and without regard to the comparative humidities of the respective air streams.

In addition to utilizing apparatus of the type shown in FIGURE 39 as an indirect dehumidifier and as a humidifier-dehumidifier, such apparatus may be employed as a fuel cell. If, for example, housing portions 201 and 202 are either electrically insulated or formed of electrically nonconductive materials, partition 209 may be either a solid or liquid electrolyte. Elements 210 in contact with either face of the electrolyte may include catalytic materials. Accordingly, when fuel and oxidant are separately supplied through conduits 204 and 205, electrical energy will be produced by the cell.

Apparatus 200 will be noted to constitute an opposed face counter-current distribution system such as system 49 shown in FIGURE 25. By the simple expedient of relatively rotating the housing portions 201 and 202, either a cross-current or concurrent opposed face distribution system such as shown in FIGURES 22–24 inclusive and FIGURE 26, respectively, may be constructed.

A still further specific application of the invention is illustrated in FIGURE 40 which shows a humidifier 300. The humidifier is comprised of a housing 301 to which fluid to be humidified is supplied through conduit 302 and from which humidified fluid is exhausted through conduit 303. Liquid permeable partitions 304 are mounted within the housing 301 at spaced intervals to form mass transfer surfaces. Channeled sheet assemblies 305 are mounted adjacent each mass transfer surface and are provided with imperforate sheets 306 adjacent the face remote from each transfer surface. The channeled sheet assemblies 305 may take the form of any of the channeled sheet assemblies shown in FIGURES 18–21, inclusive.

Water or any other liquid having a significant vapor pressure under operating conditions may be supplied to the housing 301 through conduits 307. Liquid will penetrate the partitions 304 so as to form a film on the surface of the partition adjacent the channeled sheet assembly 305. Air or any other gas capable of evaporating liquid is supplied to the channeled sheet assembly 305 through inlet conduit 302. The gaseous material will impinge on the liquid film as indicated by impingement arrows 308. The gaseous material together with liquid converted to the vapor phase will be exhausted from the apparatus 300 through exhaust conduit 303.

FIGURE 41 schematically illustrates an electrical power generating system 400 comprised of a fuel cell 401, a dehumidifier 402, and a humidifier 403. The fuel cell 401 is supplied with fuel, oxidant, and coolant. A suitable fuel cell is illustrated in FIGURES 31–38, inclusive, although other forms of fuel cells may be employed. The dehumidifier 402 may be of the construction shown in FIGURE 39, although dehumidifiers have impermeable partitions are preferred. The humidifier 403 is preferably of the construction shown in FIGURE 40.

Oxygen is supplied to the generating system 400 through conduit 404 which is connected to the humidifier 403. Humidified oxidant is conducted from the humidifier 403 to the fuel cell 401 through conduit 405. The oxidant is humidified to prevent excessive drying of the electrolyte within the fuel cell. A portion of the oxidant will be reacted within the fuel cell while the remainder of the oxidant may be used to educt the reaction products formed. When the reaction product is water, it may be desired to recover a portion of the water to humidify the incoming oxidant. Accordingly, excels oxidant and a portion of the reaction products are exhausted from the fuel cell through conduit 406 and conducted to the dehumidifier 402.

Coolant is supplied to the dehumidifier 402 through conduit 407. Energy transfer from the oxidant-reaction product mixture to the coolant condenses at least a portion of the reaction product. The condensed portion of the reaction product will be supplied to the humidifier through conduits 408. The remainder of the oxidant-reaction product mixture will be exhausted through conduit 409.

Coolant is transported from the dehumidifier to the fuel cell through conduit 410 and is exhausted from the fuel cell through conduit 411. Fuel is supplied to the fuel cell through conduit 412 and may, if desired, be exhausted through conduit 413.

The power generating system 400 is preferred to be operated on fuel and oxidants which yield water as a reaction product. In a preferred form the dehumidifier 402 and humidifier 403 may be thermally insulated to function adiabatically thus being independent of ambient temperature. The relative positions of the conduits supplying and exhausing fluids to the fuel cell, dehumidifier, and humidifier are chosen for convenience of illustration only and are not intended to limit the scope of the invention.

While the invention has been elaborately described and illustrated, still other combinations and variations will be obvious to one skilled in the art. It is, accordingly, intended that the scope of the invention be determined by reference to the following claims.

What I claim as new and desire to secure by Letters Patent of the United States is:

1. An opposed face fluid distribution system comprising
   a transfer sheet providing first and second extended transfer surfaces on opposite faces thereof,
   first and second channeled sheet assemblies mounted adjacent said first and second transfer surfaces respectively and substantially co-extensive therewith,
   each said channeled sheet assembly comprising
      a perforate sheet corrugated to form first channels opening toward said adjacent transfer surface and second channels opening away from said adjacent transfer surface,
      said corrugated perforate sheet including perforations in at least one area portion, said perforations having a tapered nozzle configuration, said one areal portion having a high perforation density,
   first and second imperforate sheets mounted adjacent said first and second channeled sheet assemblies respectively,
   said first channeled sheet assembly including first means mounted to direct fluid flow between said transfer sheet and said first imperforate sheet through the perforations in said first channeled sheet assembly and into impingement with said first transfer surface, and
   said second channeled sheet assembly including second means mounted to direct fluid flow between said transfer sheet and said second imperforate sheet through the perforations in said second channeled sheet assembly and into impingement with said second transfer surface.

2. An opposed face fluid distribution system according to claim 1 in which absorbent material is mounted in the first channels of the first channeled sheet assembly.

3. An opposed face fluid distribution system according to claim 1 in which the transfer sheet is formed of fluid pervious materials.

4. An opposed face fluid distribution system according to claim 1 in which the transfer sheet is formed of fluid impervious materials.

5. An opposed face fluid distribution system according to claim 1 in which at least one of the first and second fluid directing means is comprised of first plug means mounted in each end of said first channels and second plug means mounted in alternate ends of said second channels.

6. An opposed face fluid distribution system according to claim 1 in which at least one of the first and second fluid directing means is comprised of plug means mounted in each end of said first and second channels.

7. A fluid distribution system comprising
   a transfer sheet providing an extended transfer surface,
   a first channeled sheet assembly mounted adjacent said transfer surface and substantially co-extensive therewith,
   a first imperforate sheet mounted adjacent said first channeled sheet assembly and remote from said transfer surface,
   a second channeled sheet assembly mounted adjacent said first imperforate sheet,
   a second imperforate sheet mounted adjacent said second channeled sheet assembly and remote from said first channeled sheet assembly,
   each said channeled sheet assembly comprising
      a perforate sheet corrugated to form first channels opening toward said transfer surface and second channels opening away from said transfer surface,
      said corrugated perforate sheet including perforations in at least one areal portion, said perforations having a tapered nozzle configuration, said one areal portion having a high perforation density,
   said first channeled sheet assembly including first means mounted to direct fluid flow between said transfer sheet and said first imperforate sheet through the perforations in said first channeled sheet assembly and into impingement with said transfer surface, and
   said second channeled sheet assembly including second means mounted to direct fluid flow between said first imperforate sheet and said second imperforate sheet through the perforations in said second channeled sheet assembly and into impingement with said first imperforate sheet.

8. A fluid distribution system according to claim 7 in which absorbent material is mounted in the first channels of the first channeled sheet assembly.

9. A fluid distribution system according to claim 7 in which the transfer sheet is formed of fluid pervious materials.

10. A fluid distribution system according to claim 7 in which the transfer sheet is formed of fluid impervious materials.

11. A fluid distribution system according to claim 7 in which at least one of the first and second fluid directing means is comprised of first plug means mounted in each end of said first channels and second plug means mounted in alternate ends of said second channels.

12. A fluid distribution system according to claim 7 in which at least one of the first and second fluid directing means is comprised of plug means mounted in each end of said first and second channels.

13. A fuel cell comprising
an electrolyte component having opposed faces, first and second bodies of catalytic material contiguous with said opposed faces,
first and second channeled sheet assemblies contacting said first and second bodies of catalytic material respectively,
each said channeled sheet assembly comprising
a perforate sheet corrugated to form first channels opening toward said catalytic material and second channels opening away from said catalytic material,
said corrugated perforate sheet including perforations in at least one areal portion, said perforations having a tapered nozzle configuration, said one areal portion having a high perforation density,
first and second imperforate sheets mounted adjacent said first and second channeled sheet assemblies respectively,
said first channeled sheet assembly including first means mounted to direct fuel flow between said catalytic material and said first imperforate sheet through the perforations in said first channeled sheet assembly and into impingement with said first body of catalytic material, and
said second channeled sheet assembly including second means mounted to direct oxidant flow between said catalytic material and said second imperforate sheet through the perforations in said second channeled sheet assembly and into impingement with said second body of catalytic material.

14. A fuel cell according to claim 13 in which said corrugated perforate sheet of at least one of said first and second channeled sheet assemblies is formed of electrically conductive material and functions as a current collector.

15. A fuel cell according to claim 13 in which a body of absorbent material is mounted in the first channels of at least one of said first and second channeled sheet assemblies.

16. A fuel cell according to claim 13 in which at least one of the first and second fluid directing means is comprised of first plug means mounted in each end of said first channels and second plug means mounted in alternate ends of said second channels.

17. A fuel cell according to claim 13 in which at least one of the first and second fluid directing means is comprised of plug means mounted in each end of said first and second channels.

18. A fuel cell according to claim 13 in which a third channeled sheet assembly is mounted adjacent one of said first and second imperforate sheets and a third imperforate sheet is mounted adjacent said third channeled sheet assembly, said third channeled sheet assembly comprising
a corrugated perforate sheet of the type employed in said first and second channeled sheet assemblies, and
third means mounted to direct coolant flow between one of said first and second imperforate sheets and said third imperforate sheet through the perforation in said third channeled sheet assembly and into impingement with one of said first and second imperforate sheets.

19. A fuel cell according to claim 13 in which said electrolyte component is formed from a solid ion exchange membrane.

20. A fuel cell according to claim 13 in which said perforations have a density of 160–180,000 perforations per square inch.

21. A fuel cell according to claim 13 in which said perforations have a density of 2,000–15,000 perforations per square inch.

22. A fuel cell comprising
an ion exchange membrane having opposed faces,
first and second bodies of catalytic material substantially co-extensive with said opposed faces,
first and second channeled sheet assemblies contacting the catalytic material on opposed faces of said membrane,
each said channeled sheet assembly comprising
a perforate sheet comprising first mutually spaced portions lying in a first plane, second mutually spaced portions lying in a second plane, rib means connecting said first and second portions to form channels opening alternately toward said first and second planes, said rib means forming an angle of 20–87 degrees with respect to said first and second planes,
said perforate sheet having perforations in at leats one area thereof, said perforations having a tapered nozzle configuration, said one areal portion having a high perforation density,
first and second imperforate sheets mounted adjacent said first and second channeled sheet assemblies respectively,
said first channeled sheet assembly including first means mounted to direct fuel flow between said catalytic material and said first imperforation sheet through the perforations in said first channeled sheet assembly and into impingement with said first body of catalytic material, and
said second channeled sheet assembly including second means mounted to direct oxidant flow between said catalytic material and said second imperforate sheet through the perforations in said second channeled sheet assembly and into impingement with said second body of catalytic material.

23. A fuel cell according to claim 22 in which said first and second spaced portions are ¼ to ½ inch in width.

24. A fuel cell according to claim 22 in which said perforate sheet of at least one of said first and second channeled sheet assemblies is formed of electrically conductive material and functions as a current collector.

25. A fuel cell according to claim 22 in which a body of absorbent material is mounted in the channels opening toward said catalytic material of at least one of said first and second channeled sheet assemblies.

26. A fuel cell according to claim 22 in which at least one of the first and second fluid directing means is comprised of first plug means mounted in each end of the channels opening toward the catalytic material and second plug means mounted in alternate ends of the channels opening away from the catalytic material.

27. A fuel cell according to claim 22 in which at least one of the first and second fluid directing means is comprised of plug means mounted in each end of each channel.

28. A fuel cell according to claim 22 in which a third channeled sheet assembly is mounted adjacent one of said first and second imperforate sheets and a third imperforate sheet is mounted adjacent said third channled sheet assembly, said third channled sheet assembly comprising
   a channeled perforate sheet of the type employed in said first and second channeled sheet assemblies, and
   third means mounted to direct coolant flow between one of said first and second imperforate sheets and said third imperforate sheet through the perforations in said third channeled sheet assemblies and into impingement with one of said first and second imperforate sheets.

29. A fuel cell according to claim 22 in which the perforation have a density of 2,000–15,000 perforations per square inch.

30. An apparatus comprising
   housing means,
   partition means mounted within said housing means having first and second faces,
   first and second channeled sheet asemblies mounted adjacent said first and second faces respectively and substantially co-extensive therewith,
   each said channeled sheet assembly comprising
      a perforate sheet corrugated to form first channels opening toward said partition means and second channels opening away from said partition means,
      said corrugated perforate sheet including perforations in at least one areal portion, said perforations having a tapered nozzle configurate, said one areal portion having a high perforation density,
   means separately supplying first and second fluids to said first and second faces respectively,
   said first channeled sheet assembly including first means mounted to direct said first fluid between said first face and said housing means through the perforations in said first channeled sheet assembly and into impingement with said first face, and
   said second channeled sheet assembly including said means mounted to direct said second fluid between said second face and said housing means through the perforation in said second channled sheet assembly and into impingement with said second fact.

31. An apparatus according to claim 30 additionally comprising means adjacent at least one of said first and second faces for removing liquid condensate from said housing means.

32. An apparatus according to claim 30 in which said portion means in fluid permeable.

33. In a cell having a catalytic body lying at the interface of an electrolyte and a fluid reactant, the improvement comprising
   a channeled sheet assembly lying in contact with said body comprising
      imperforate means lying in planar spaced relation with said body,
      a corrugated sheet having a plurality of spaced first portions lying in contact with said body, a plurality of interposed spaced portions lying in contact with said imperforate means, and a plurality of sloping rib portions interconnecting said first and second portions.
      said first, second, and rib portions of said corrugated sheet defining a plurality of first channels opening toward said imperforate means and a plurality of interposed second channels opening toward said body,
      each of said sloping rib portions including a multiplicity of perforations,
   means constructed and arranged for directing the fluid reactant only into alternate of said first channels,
   means blocking longitudinal exit of the fluid reactant through said alternate first channels, whereby the fluid reactant is deflected through the perforations of said sloping rib portions defining said alternate channels and impinges upon said body, and
   means blocking longitudinal exit of the fluid reactant from said second channels, whereby the fluid reactant is directed through the perforations of said rib portions defining the remaining of said first channels for exit from said cell through said remaining first chanels.

34. In a cell having a catalytic body lying at the interface of an electrolyte and a fluid reactant, the improvement comprising
   a channel sheet assembly lying in contact with said body comprising
      imperforate means lying in spaced relation with said body,
      a corrugated sheet having a plurality of spaced first portions lying in contact with said body, a plurality of interposed spaced second portions lying in contact with said imperforate means, and a plurality of sloping rib portions interconnecting said first and second portions.
      said first, second, and rib portions of said corrugated sheet defining a plurality of first channels opening toward said imperforate means and a plurality of interposed second channels opening toward said body,
      each of said sloping rib portions including a multiplicity of perforations,
   plug means positioned adjacent each end of each of the channels so that the fluid reactant is prevented from escaping from the channels through the ends thereof,
   one of said rib portions lying nearest one edge of said corrugated sheet being arranged to intercept over substantially its entire length the fluid reactant as it enters said cell, whereby the fluid reactant is uniformly deflected by the perforations in said one rib portion into impingement with said body and is uniformly distributed serially through the remaining of said rib portions.

35. In a cell having a catalytic body lying at the interface of an electrolyte and a fluid reactant, the improvement comprising
   a channeled sheet assembly lying in contact with said body comprising
      a corrugated sheet having a plurality of spaced first portions lying in contact with said body, a plurality of interposed spaced second portions lying out of contact with said body, and a plurality of rib portions interconnecting said first and second portions,
      said first, second, and rib portions of said corrugated sheet defining a plurality of channels including a first channel opening away from said said body and a second channel opening toward said body,
      at least said second portions and said rib portions including a multiplicity of perforations,
   means overlying said corrugated sheet and cooperating with said second portions to uniformly distribute the fluid reactant through the perforations in said second portions into impingement with said body,
   first plug means positioned adjacent each end of the second channel so that the fluid reactant is prevented from escaping from the second channel through the ends thereof, and
   second plug means positioned adjacent only one end of said first channel, so that an unconsumed portion of the fluid reactant exits from said cell through the first channel.

(References on following page)

References Cited

UNITED STATES PATENTS

| | | | |
|---|---|---|---|
| 2,405,527 | 8/1946 | Skolnik | 161—113 X |
| 2,758,083 | 8/1956 | Van Hoek et al. | |
| 2,847,086 | 8/1958 | Muller | 55—486 X |
| 3,053,032 | 9/1962 | Young | 55—482 X |
| 3,282,334 | 11/1966 | Stahlheber | 165—166 |

FOREIGN PATENTS

| | | |
|---|---|---|
| 659,067 | 3/1963 | Canada. |
| 823,648 | 11/1959 | Great Britain. |

ALLEN B. CURTIS, *Primary Examiner.*

U.S. Cl. X.R.

165—166; 204—180; 55—521; 261—104